United States Patent [19]
Sedlmeir

[11] 3,921,582
[45] Nov. 25, 1975

[54] LAVATORY FOR DOGS AND OTHER DOMESTICATED PETS

[76] Inventor: Kate Sedlmeir, 135-30 82nd Drive, Jamaica, N.Y. 11435

[22] Filed: Feb. 25, 1974

[21] Appl. No.: 445,165

[52] U.S. Cl. .................................................. 119/1
[51] Int. Cl.² ........................................ A01K 29/00
[58] Field of Search ........... 119/1; 4/10, 110, 98, 80

[56] References Cited
UNITED STATES PATENTS
2,779,948   2/1957   Houle ........................................ 4/10
3,793,988   2/1974   Traeger ...................................... 119/1

Primary Examiner—Russell R. Kinsey
Assistant Examiner—Peter K. Skiff
Attorney, Agent, or Firm—Richard L. Miller

[57] ABSTRACT

A lavatory designed specifically to be used by a household pet such as a dog or other animals; the device including a platform upon which the animal sits while defecating into a bowl to which a water supply hose is connected so to flush away the feces wither into a storage receptacle so to be discarded later, or else directly into a sewer of a house.

1 Claim, 4 Drawing Figures

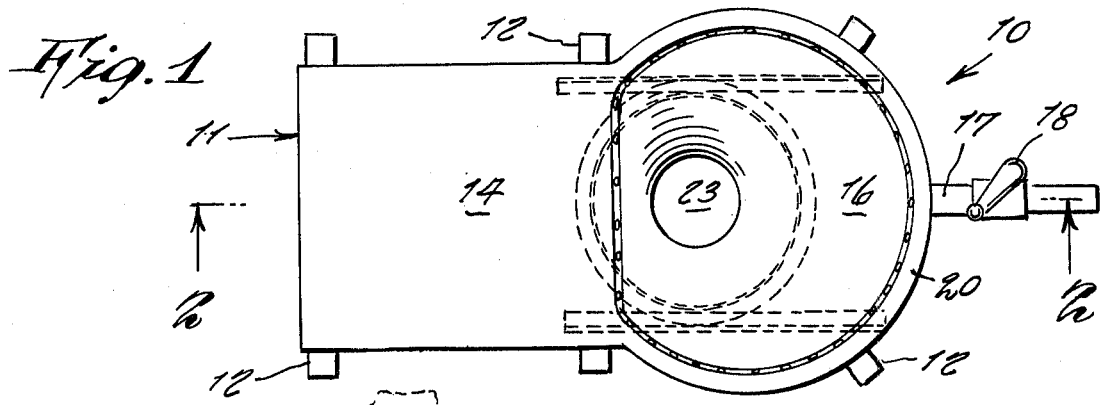
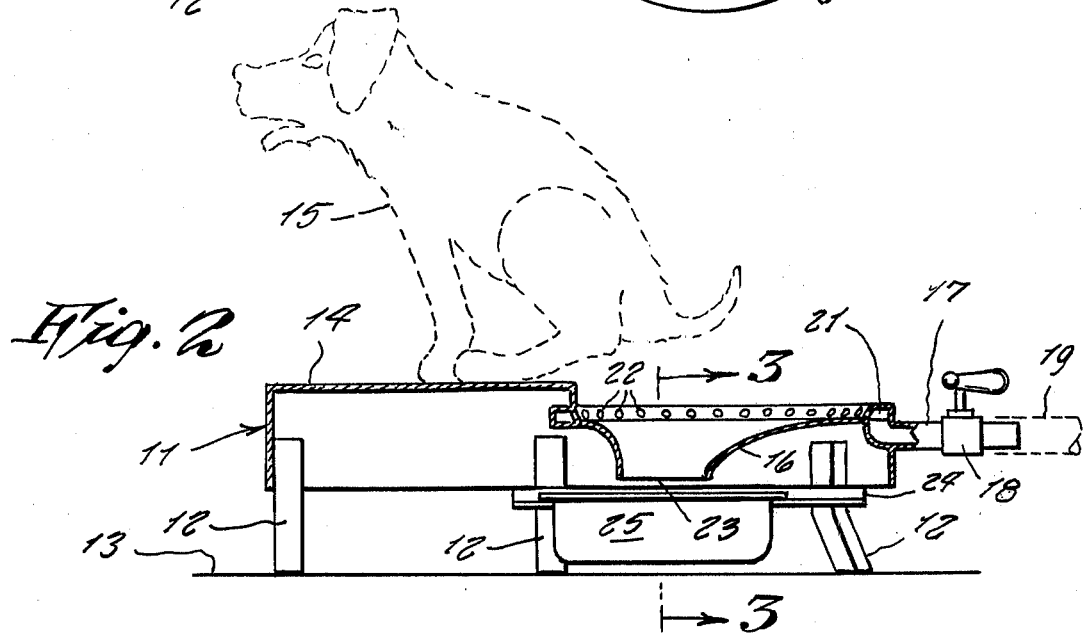
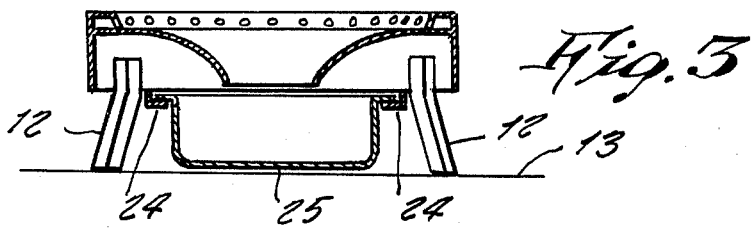
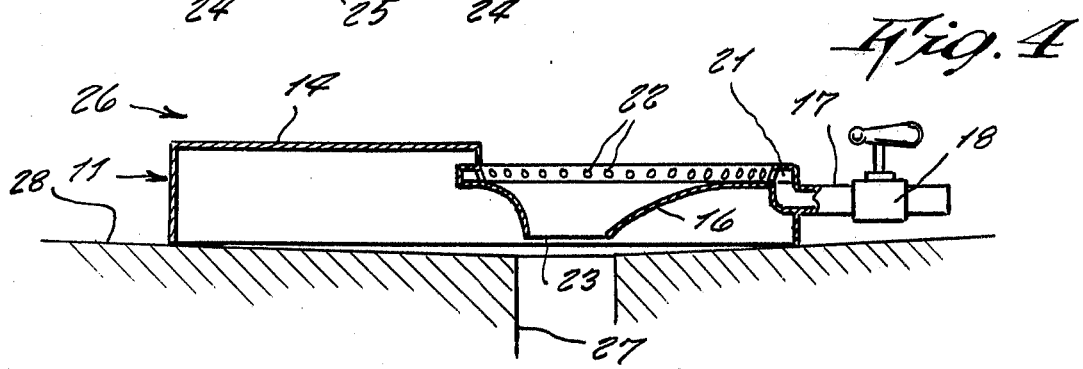

LAVATORY FOR DOGS AND OTHER DOMESTICATED PETS

This invention relates generally to equipment associated with domesticated pets such as are kept within a person's own home.

It is generally well known to persons who keep pets such as dogs and the like within their own homes, that it is a problem to effectively handle the animal defecation. In most situations, if the animal is a dog or cat, a box or pan containing disposable litter is kept in the house for this purpose. Such method, however, is not ideal as the litter needs very frequent changing so to prevent objectionable odors. Alternately, if the pet is a dog, it must periodically be "walked" on a leash which is a bothersome chore. This situation is accordingly in want of an improvement.

Therefore, it is a principle object of the present invention to provide a lavatory for use in a home and which is for use by the household pet, the lavatory being designed to incorporate features such as are present in lavatories used by humans in order to be maximumly efficient.

Another object is to provide a pet lavatory that utilizes water so to flush away animal waste in order to eliminate odors.

Still another object is to provide a pet lavatory that can be made in various sizes so to suit large or small pets.

Other objects are to provide a lavatory for dogs and other domesticated pets which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a top view of the present invention.

FIG. 2 is a side cross sectional view taken on line 2—2 of FIG. 1.

FIG. 3 is a transverse cross-sectional view taken on line 3—3 of FIG. 2.

FIG. 4 is a side cross sectional view of a modified design of the invention.

Referring now to the drawing in detail, and more particularly to FIGS. 1 to 3 at this time, the reference numeral 10 represents a lavatory for dogs and other domesticated pets, according to the present invention, wherein there is a main member 11 mounted upon legs 12 so to be elevated above a floor 13, the member forming a raised platform 14 at one end upon which an animal 15 may sit during defecation, and a bowl 16 at its other end into which feces or urine may fall.

The bowl 16 has a water inlet pipe 17 connected to an upper edge thereof, the pipe being fitted with shutoff hand valve 18. The pipe is adaptable to be connected to a fresh water supply hose 19 that is connected at its other end to a water faucet of the house.

The upper edge 20 of the bowl has peripheral channel or duct 21 formed therein and which communicates with pipe 17. A series of openings 22 along the duct allow the fresh water to flush the entire bowl surface. The bowl tapers downwardly at its center to a small offset opening 23.

A pair of parallel, spaced apart track rails 24 integral with a lower edge of member 11 serve to slidably support a storage receptacle 25 beneath opening 23, so that the receptacle can catch animal wastes, and which is removable so to be emptied.

The entire device is preferably made of a molded hard plastic material so that it has no crevices in order to easily be kept clean, and also so to be inexpensive. It can be made in any attractive colors so to harmonize with a home decor.

In use, as shown in FIG. 2, the animal simply sits upon the platform and eliminates into the bowl, after which the bowl is flushed.

In FIG. 4, a modified design of lavatory 26 is comprised only of the above described member 11 and the inlet pipe 17, and does not include legs 12 nor the removable storage receptacle 25. This form of the invention is simply placed over a sewer inlet 27 such as is provided in floors 28 of laundry rooms, cellars and garages of private homes, or parks, so that the animal wastes drop from bowl opening 23 directly into the sewer, thus eliminating the chore to empty out any storage receptacle.

Thus a useful invention has been provided.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In a lavatory for dogs and other demesticated pets, the combination of a thin-walled main body which at one end forms a horizontal platform upon which an animal squats, and a circular bowl at its other end into which said animal defecates, an upper edge of said bowl being at a lower elevation than said platform, a peripheral, downward extending wall around said main body, a circular opening in a bottom of said bowl, said bowl having a side wall that is inwardly concaved, so an upper portion thereof is more horizontal than a lower portion, said bottom opening being on a vertical axis that is disaligned with a vertical axis of an upper end of said bowl whereby said inwardly concaved wall has a longer said horizontal portion at one end and a shorter relative horizontal portion at a diametrically opposite end, said shorter relative horizontal portion being adjacent said other end of said platform, means to flush said bowl side wall comprising an integral peripheral channel means around said upper edge of said bowl, said channel being connected to a water supply pipe, a plurality of openings along an inner peripheral wall of said channel for flushing water, a hand valve on said pipe, said main body being mounted upon legs, a lower edge of said main body having a pair of parallel, spaced apart track rails, and a removable receptacle having a sideward flange around an upper edge that is slidable upon said rails between a position under said bowl bottom opening and an end edge of said main body for removal.

* * * * *